(12) United States Patent
Sun et al.

(10) Patent No.: US 9,778,459 B1
(45) Date of Patent: Oct. 3, 2017

(54) ASSEMBLY TO REDUCE LIQUID DROPLET ACCUMULATION

(71) Applicant: GM GLOBAL TECHNOLOGY OPERATIONS LLC, Detroit, MI (US)

(72) Inventors: Hongguang Sun, Whitby (CA); Michael D. Alarcon, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/270,042

(22) Filed: Sep. 20, 2016

(51) Int. Cl.
| | |
|---|---|
| *G02B 27/00* | (2006.01) |
| *G02B 7/02* | (2006.01) |
| *G03B 17/12* | (2006.01) |
| *B60R 1/06* | (2006.01) |
| *B60R 1/12* | (2006.01) |
| *B60Q 1/00* | (2006.01) |
| *B60Q 1/26* | (2006.01) |

(52) U.S. Cl.
CPC ........ *G02B 27/0006* (2013.01); *B60R 1/0602* (2013.01); *B60R 1/12* (2013.01); *G02B 7/02* (2013.01); *G03B 17/12* (2013.01); *B60Q 1/0017* (2013.01); *B60Q 1/2619* (2013.01); *B60Q 1/2665* (2013.01); *B60R 1/1207* (2013.01); *B60R 2001/1253* (2013.01); *B60R 2300/60* (2013.01); *B60R 2300/804* (2013.01)

(58) Field of Classification Search
USPC ......................................... 396/429
See application file for complete search history.

(56) References Cited

U.S. PATENT DOCUMENTS

| | | | | |
|---|---|---|---|---|
| 2003/0098908 A1* | 5/2003 | Misaiji | ...................... | B60R 1/00 348/148 |
| 2004/0218041 A1* | 11/2004 | Yagi | .......................... | B60R 1/12 348/148 |

\* cited by examiner

*Primary Examiner* — Rochelle-Ann J Blackman

(57) ABSTRACT

An assembly to reduce droplet accumulation and impingement on a lens assembly is disclosed. The assembly includes a camera body; a camera lens mounted within the camera body; and a groove surrounding the camera body. The groove has a first portion defined by a first sidewall, a second sidewall, and a first floor portion and a second portion defined by the first sidewall, a third sidewall, and a second floor portion. The first portion has a first width and a second portion has a second width larger than the first width.

20 Claims, 6 Drawing Sheets

US 9,778,459 B1

ASSEMBLY TO REDUCE LIQUID DROPLET ACCUMULATION

FIELD OF THE INVENTION

The present invention relates generally to the field of vehicles and, more specifically, to an assembly having a groove to reduce droplet impingement and accumulation on a surface of a camera lens or light source and improve surface cleanliness.

INTRODUCTION

Cameras and light sources embedded in side-mounted rear view mirrors of a vehicle provide information used for automation of aspects of vehicle operation, including, for example, lane marker identification. However, the camera lens or surface of the light source can become obscured or dirty due to the accumulation of liquid on the surface of the lens, such as rain drops, as the vehicle travels forward. There is a need for a lens or surface clearing assembly that will reduce the flow of accumulated liquid in front of and on the surface of the lens or light source.

SUMMARY

Embodiments according to the present disclosure provide a number of advantages. For example, embodiments according to the present disclosure enable reduced view obstruction and reduction of liquid accumulation in front of and on the camera lens of a camera mounted on a side-mounted rear view mirror.

In one aspect, a camera lens assembly is disclosed. The camera lens assembly includes a camera body; a camera lens mounted within the camera body; and a groove surrounding the camera body, the groove having a first portion defined by a first sidewall, a second sidewall, and a first floor portion and a second portion defined by the first sidewall, a third sidewall, and a second floor portion; wherein the first portion has a first width and a second portion has a second width larger than the first width.

In some aspects, the first portion is located forward of the camera lens. In some aspects, the second portion is located rearward of the camera lens. In some aspects, the first portion is separated from the camera body by a separating portion that defines a spacing distance. In some aspects, the second portion is adjacent to the camera body. In some aspects, the camera body and the groove are circular and the first portion extends around a circumference of the camera body.

In another aspect, an automotive vehicle is disclosed. The automotive vehicle includes a vehicle body; at least one mirror mounted to a side of the vehicle body, the at least one mirror having a housing and a reflective surface mounted within the housing; and a camera lens assembly coupled to an underside of the housing, the camera lens assembly having a camera body, a camera lens mounted within the camera body, and a groove encircling the camera body; wherein the groove has a first portion defined by a first sidewall, a second sidewall and a first floor portion and a second portion defined by the first sidewall, a third sidewall, and a second floor portion, and the first portion has a first width and the second portion has a second width larger than the first width.

In some aspects, the first portion is located forward of the camera lens. In some aspects, the second portion is located rearward of the camera lens. In some aspects, the first portion is separated from the camera body by a separating portion that defines a spacing distance. In some aspects, the second portion is adjacent to the camera body. In some aspects, the camera body and the groove are circular and the first portion extends around a circumference of the camera body.

In yet another aspect, a side-mounted mirror for a vehicle is disclosed. The side-mounted mirror includes a housing; a reflective surface mounted within the housing; and an asymmetrical circular recessed area formed in an underside of the housing, the recessed area encircling a lens assembly and configured to reduce liquid droplet accumulation on the lens assembly.

In some aspects, the recessed area has a first portion defined by a first sidewall, a second sidewall and a first floor and a second portion defined by the first sidewall, a third sidewall, and a second floor, and the first portion has a first width and a first depth and the second portion has a second width and a second depth and the second width is larger than the first width. In some aspects, the side-mounted mirror further includes a camera lens assembly coupled to the underside of the housing, the camera lens assembly having a camera body and a camera lens mounted within the camera body, wherein the asymmetrical recessed area encircles the camera body. In some aspects, the first portion is located forward of the camera lens. In some aspects, the second portion is located rearward of the camera lens. In some aspects, the first portion is separated from the camera body by a separating portion that defines a spacing distance. In some aspects, the second portion is adjacent to the camera body. In some aspects, the camera body and the recessed area are circular and the first portion extends around the circumference of the camera body.

BRIEF DESCRIPTION OF THE DRAWINGS

The present disclosure will be described in conjunction with the following figures, wherein like numerals denote like elements.

Figure 1:
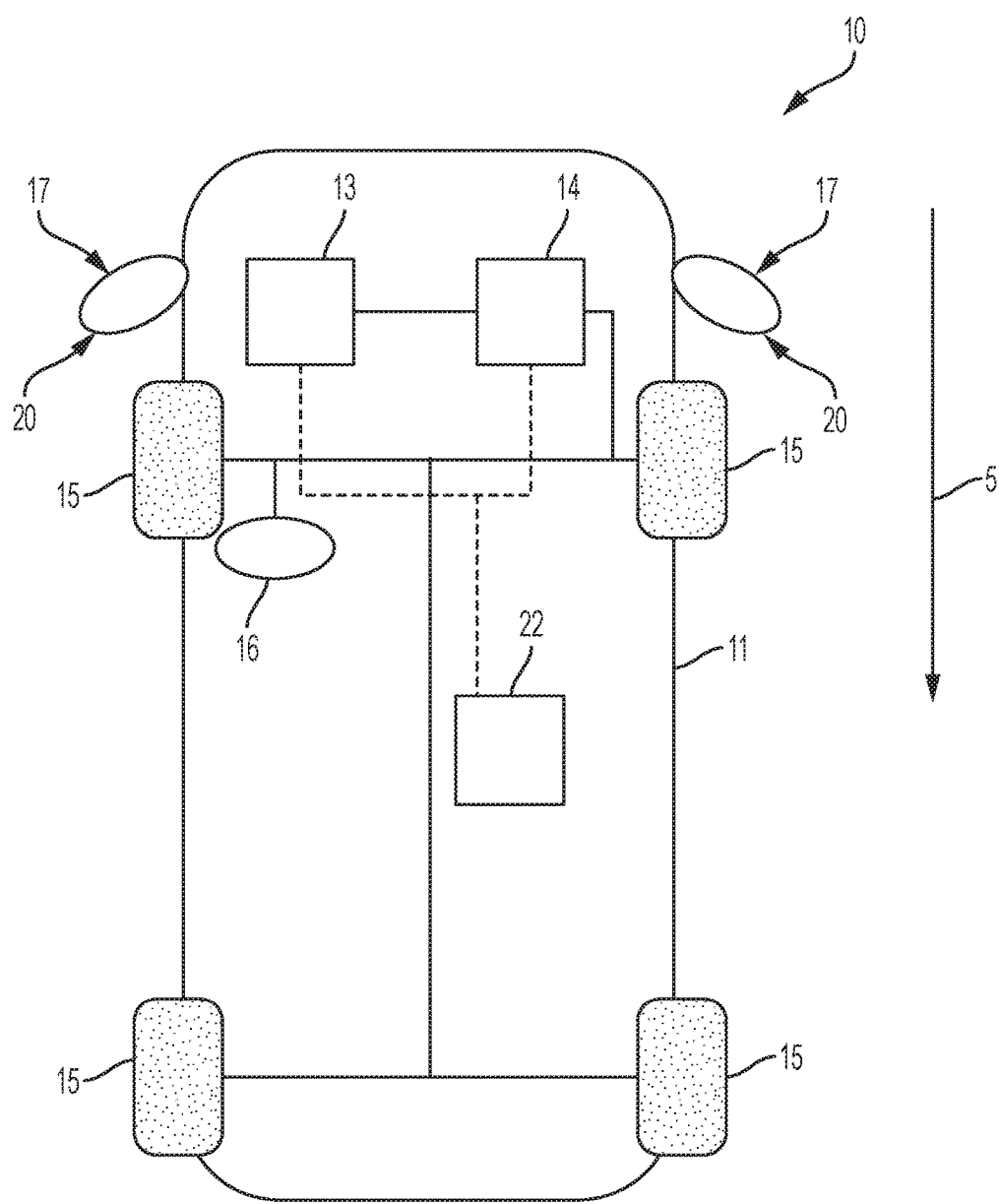
FIG. 1 is a schematic diagram of a vehicle with side-mounted rear view mirrors configured to support a camera lens assembly, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an automotive vehicle 10 according to the present disclosure. The vehicle 10 generally includes a body 11 and wheels 15. The body 11 encloses the other components of the vehicle 10. The wheels 15 are each rotationally coupled to the body 11 near a respective corner of the body 11. The vehicle 10 further includes side-mounted rear view mirror assemblies 17 coupled to the body 11. Each side-mounted rear view mirror assembly or assemblies 17 includes a housing 18 enclosing a reflective surface 20 and a camera assembly 19 (see FIG. 2). The reflective surfaces of the mirrors 17 provide rear and/or side visibility to the operator of the vehicle 10 on one or both sides of the vehicle. The camera assemblies 19 provide additional information, such as lane marker detection, that may be used by various subsystems of the vehicle 10. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes wheel brakes (not shown) configured to provide braking torque to the vehicle wheels 15. The wheel brakes may, in various embodiments, include friction brakes, a regenerative braking system such as an electric machine, and/or other appropriate braking systems.

The vehicle 10 additionally includes a steering system 16. While depicted as including a steering wheel and steering column for illustrative purposes, in some embodiments, the steering system 16 may not include a steering wheel.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

Figure 2:
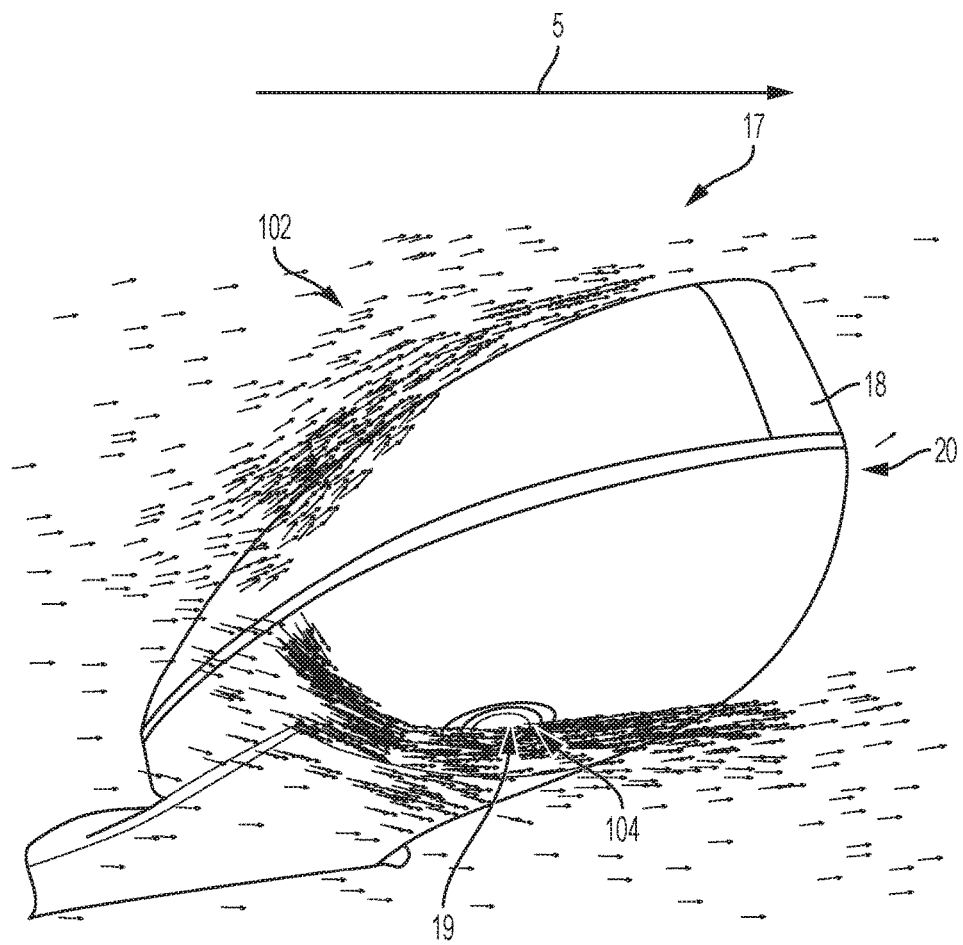
FIG. 2 is a schematic diagram of a side-mounted rear view mirror with a camera lens assembly, according to an embodiment.

FIG. 2 schematically illustrates the mirror assembly 17 including a housing 18 and a camera assembly 19. The camera assembly 19 is coupled to the bottom or underside of the housing 18 of the mirror assembly 17 such that the camera assembly 19 substantially faces the ground to provide a view of the environment next to the vehicle 10, such as lane markers, etc. In some embodiments, the camera assembly 19 is integrally formed with the housing 18 of the mirror assembly 17. In some embodiments, the camera assembly 19 is mounted within a receiving area of the housing 18 using any type of adhesive connection. In some embodiments, the camera assembly 19 is mounted within the receiving area of the housing 18 using a press-fit or other type of friction connection. As the vehicle 10 travels in a forward direction, air flow travels over the mirror in the direction indicated by arrow 5. During a rainstorm or other precipitation event, liquid droplets, such as the droplets 102, flow over and around the housing 18 of the mirror assembly 17 according to basic flow characteristics. As the droplets 102 flow along the bottom or underside of the housing 18, the droplets gather on the camera assembly 19 (as shown at 104) and at least partially obscure a lens of the camera assembly 19.

Figure 3:
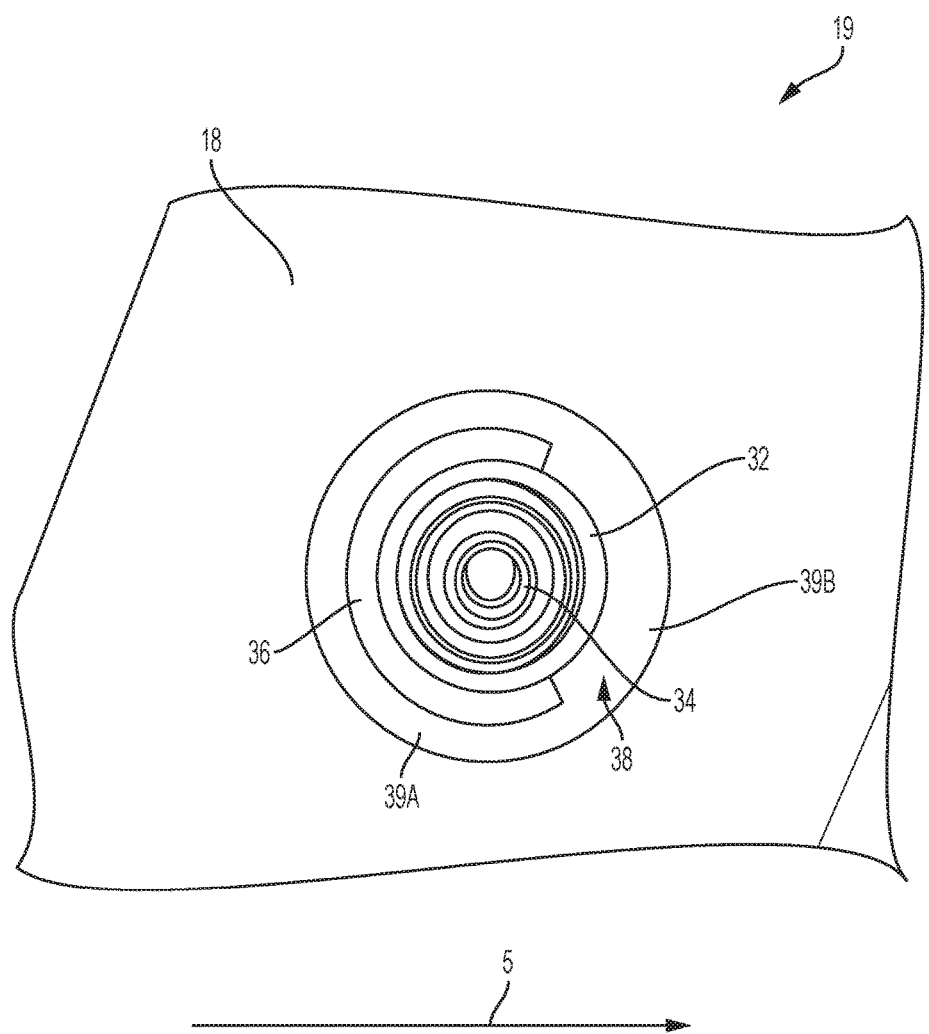
FIG. 3 is a schematic diagram of a camera lens assembly, such as the camera lens assembly of FIG. 2, according to an embodiment.
Figure 4:
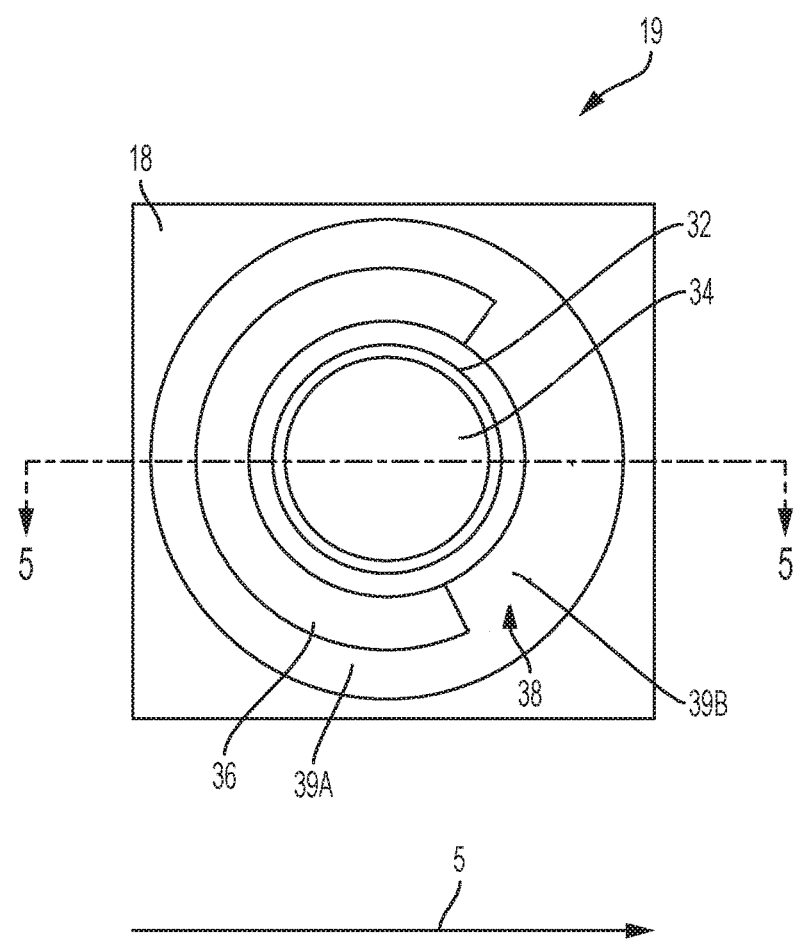
FIG. 4 is a schematic diagram of the camera lens assembly of FIG. 3, according to an embodiment.
Figure 5:
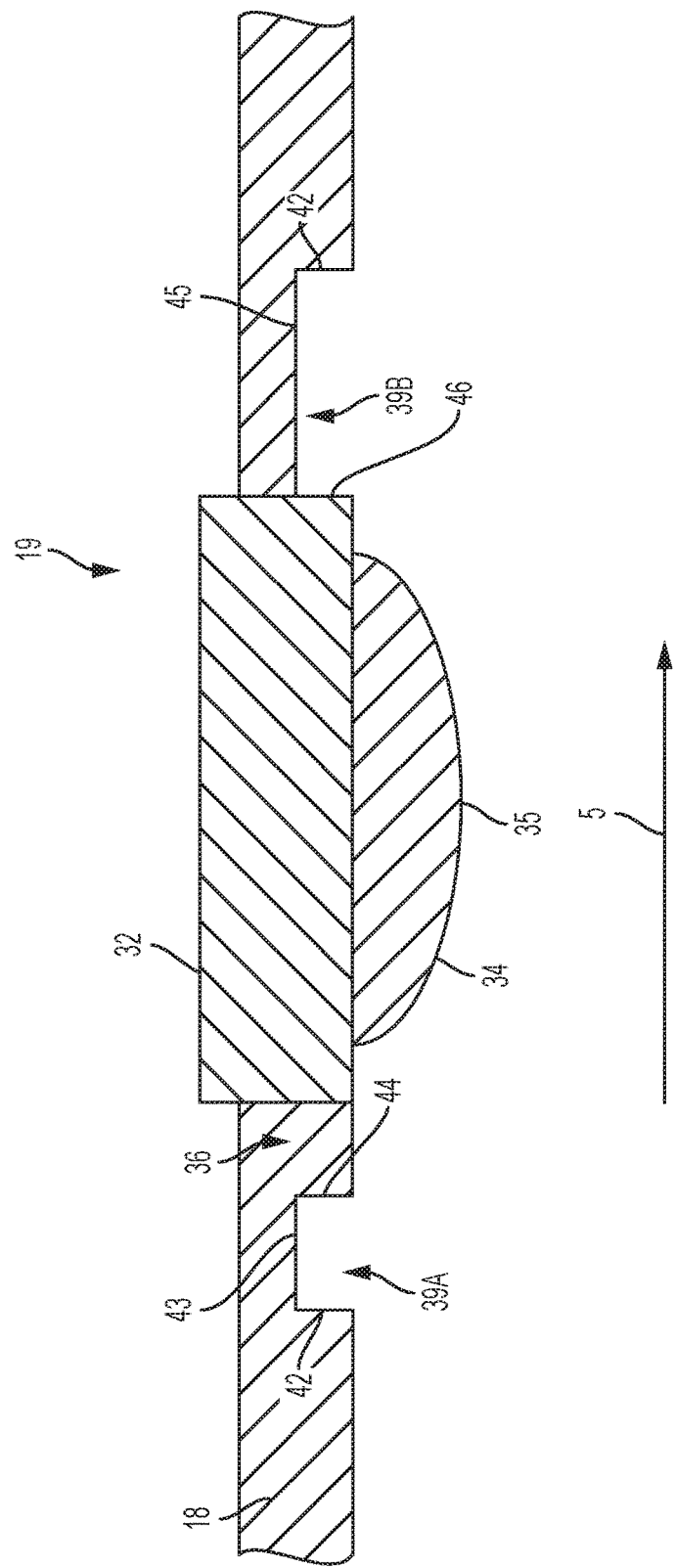
FIG. 5 is a cross-sectional schematic view of the camera lens assembly of FIG. 4, according to an embodiment.
Figure 6:
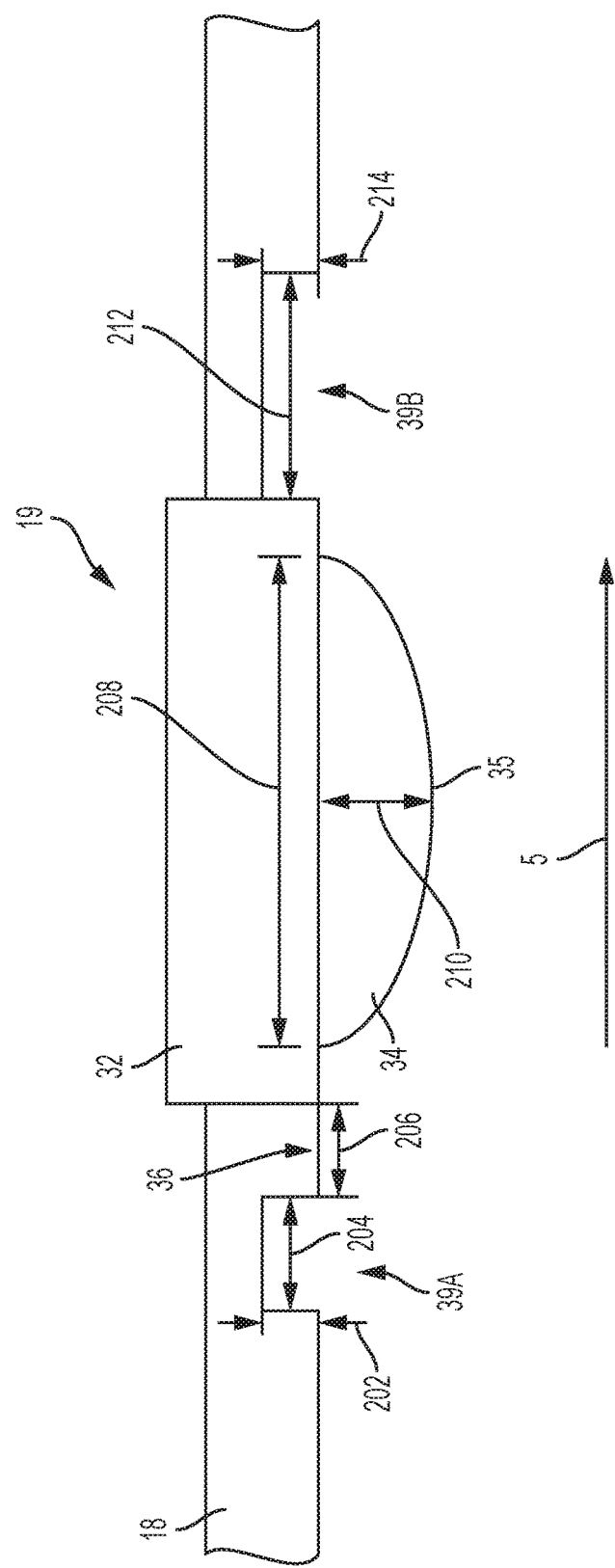
FIG. 6 is another cross-sectional schematic view of the camera lens assembly of FIG. 4, according to an embodiment.

The flow of accumulated liquid droplets in front of a lens of the camera assembly 19 can be reduced using a groove that encircles the lens. FIGS. 3 and 4 schematically illustrate components of the camera assembly 19, according to an embodiment. FIGS. 5 and 6 schematically illustrate a cross-sectional view of the camera assembly 19, according to an embodiment. The camera assembly 19 is embedded within the housing 18 of the mirror assembly 17. A camera lens body 32 includes a camera lens 34 that protrudes at least partially from the surface of the housing 18 to provide a wider field of view of the environment surrounding the vehicle 10. A groove 38 surrounds the lens body 32 and the lens 34. The groove 38 may be machined in the housing 18 of the mirror assembly 17 or may be formed during the molding process used to manufacture the housing 18. The groove 38 may be circular, elliptical, or any other shape to surround the corresponding shape of the lens body 32 and the lens 34. As shown in FIG. 6, in some embodiments, the lens 34 has a width 208 of approximately 13 mm and a depth 210 of approximately 2 mm.

With reference to FIGS. 3 and 4, the groove 38 is an asymmetrical recessed area that includes a first portion 39A having a first width and a second portion 39B having a second width. In some embodiments, the first portion 39A may extend less than 180 degrees, approximately 180 degrees, or greater than 180 degrees around the lens 34. The first portion 39A is separated from the lens body 32 by a separating portion 36. The separating portion 36 extends at least partially around the circumference of the lens body 32. As shown in FIG. 5, the first portion 39A of the groove 38 is defined by two substantially parallel sidewalls 42, 44 connected by a floor portion 43. With reference to FIG. 6, each of the sidewalls 42, 44 define a depth of the first portion 39A of the groove 38. In some embodiments, the depth 202 is approximately 1.5 mm. In some embodiments, the depth 202 is between approximately 1.5 mm and approximately 2 mm. In some embodiments, the depth 202 is between approximately 0.5 mm and approximately 5.0 mm. The length of the floor portion 43 defines a width 204 of the first portion 39A of the groove 38. In some embodiments, the width 204 is approximately 2.0 mm. In some embodiments, the width 204 is between 1.5 mm and 3.0 mm. In some embodiments, the width 204 is between 0.5 mm and 5.0 mm.

With continued reference to FIG. 6, the first portion 39A of the groove 38 is separated from the lens body 32 of the camera assembly 19 by a spacing distance 206. The separating portion 36 at least partially defines the spacing distance 206. In some embodiments, the separating portion 36 is a small portion of the housing 18 adjacent to and flush with the lens body 32. The spacing distance 206, as partially defined by the separating portion 36, allows for the formation of flow recirculation of the liquid droplets 202 at the separating portion 36 and allows the flow to reattach to the surface of the lens body 32 in front of the lens 34. If the first portion 39A of the groove 38 were positioned directly adjacent to the lens 34, the flow recirculation would form on the surface 35 of the lens 34, obstructing the view through the lens 34. In some embodiments, the spacing distance 206 is approximately 5 mm. In some embodiments, the spacing distance 206 is between approximately 4 mm and approximately 5 mm. In some embodiments, the spacing distance 206 is between approximately 3.5 mm and 8 mm. The spacing distance 206 depends on the shape of the bottom surface of the housing 18, the size of the lens 34, among other factors.

As shown in FIGS. 3-6, the second portion 39B of the groove 38 is positioned directly adjacent to the lens body 32. In some embodiments, the second portion 39B extends less than 180 degrees, approximately equal to 180 degrees, or greater than 180 degrees around the circumference of the lens body 32. As shown in FIG. 5, the second portion 39B of the groove 38 is defined by two substantially parallel sidewalls 42, 46 connected by a floor portion 45. With reference to FIG. 6, each of the sidewalls 42, 46 define a depth 214 of the second portion 39B of the groove 38. In some embodiments, the depth 214 is substantially the same as the depth 202 of the first portion 39A. In some embodiments, the depth 214 is larger than the depth 202. In some embodiments, the depth 214 is smaller than the depth 202. In some embodiments, the depth 214 is approximately 1.5 mm. In some embodiments, the depth 214 is between approximately 1.5 mm and approximately 2 mm. In some embodiments, the depth 214 is between approximately 0.5 mm and approximately 5.0 mm. The length of the floor portion 45 defines a width 212 of the second portion 39B of the groove 38. In some embodiments, the width 212 is approximately 5.0 mm. In some embodiments, the width 212 is between 4.0 mm and 6.0 mm. In some embodiments, the width 212 is between 3.0 mm and 7.0 mm. In some embodiments, the width 212 of the second portion 39B is larger than the width 204 of the first portion 39A.

As air flow travels over the housing 18 of the mirror assembly 17, as defined by arrow 5, liquid droplets impinge on the forward or front portion of the housing 18, as shown in FIG. 2. The accumulated droplets pass over the surface of the housing 18 and flow towards the surface 35 of the lens 34. The flow of accumulated liquid droplets flowing towards the lens 34 (that is, to the left of the lens 34 as shown in FIGS. 3-6) can be at least partially blocked or reduced using the groove 38. The disruption of flow over the housing 18 caused by the first portion 39A of the groove 38 reduces the liquid droplets on the surface 35 of the lens 34. The spacing distance 206, as partially defined by the separating portion 36, ensures the flow recirculation caused by the first portion 39A of the groove 38 mainly occurs on the surface of the separating portion 36 and allows the flow to reattach to the surface of the lens body 32 in front of the lens 34, therefore reducing the flow recirculation effect on the surface 35 of the lens 34. The separating portion 36 also reduces the tendency of the liquid drops blocked due to the first portion 39A of the groove 38 to flow on the surface 35 of the lens 34.

As air flow travels over the surface 35 of the lens 34, flow separation occurs at the rearward or back portion of the lens 34 (that is, to the right of the lens 34 as shown in FIGS. 3-6) and increases the accumulation of droplets on the back portion of the lens 34. The second portion 39B is adjacent to the lens body 32 behind the lens 34 (that is, to the right of the lens 34 as shown in FIGS. 3-6) such that the accumulation of liquid droplets due to flow recirculation at the back portion of the lens 34 can be quickly released to the second portion 39B of the groove 38. Positioning a varying width or asymmetrical recessed area or groove, such as the groove 38, around the lens 34 can significantly reduce liquid droplets on the lens surface 35 and improve lane marker identification.

The asymmetric groove 38 is discussed with reference to FIGS. 2-6 as used with the camera lens assembly 19. While the groove 38 is discussed with reference to the camera lens assembly 19, in other embodiments the groove 38 could be used to reduce liquid droplet accumulation and impingement on any other lens assembly or light source identified by one skilled in the art. For example, and without limitation, in other embodiments, the asymmetric groove 38 encircles other lens assemblies or light sources, such as puddle lights mounted on an underside of the housing of the side-mounted rear view mirror.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A camera lens assembly for a vehicle mirror having an exterior mounting surface, comprising:
    a camera body mounted in the mounting surface;
    a camera lens mounted within the camera body and at least partially protruding from the mounting surface; and
    a groove unitarily formed in the mounting surface and defining an asymmetrical recessed area surrounding the camera body, the groove having a first portion defined by a first sidewall, a second sidewall, and a first floor portion and a second portion defined by the first sidewall, a third sidewall, and a second floor portion;
    wherein the first portion has a first width and the second portion has a second width larger than the first width, and, as fluid passes over the vehicle mirror, the first portion of the groove is configured to disrupt the flow of fluid over the camera lens and reduce the flow of fluid over the lens.

2. The camera lens assembly of claim 1, wherein the first portion is located forward of the camera lens.

3. The camera lens assembly of claim 1, wherein the second portion is located rearward of the camera lens.

4. The camera lens assembly of claim 2, wherein the first portion of the groove is separated from the camera body by a separating surface that defines a spacing distance between the camera body and the first portion of the groove such that the fluid passing over the mounting surface of the vehicle mirror reattaches to the separating surface in front of the camera lens.

5. The camera lens assembly of claim 3, wherein the second portion is adjacent to the camera body.

6. The camera lens assembly of claim 4, wherein the camera body and the groove are circular and the first portion extends around a circumference of the camera body.

7. An automotive vehicle, comprising:
a vehicle body;
at least one mirror mounted to a side of the vehicle body, the at least one mirror comprising a housing and a reflective surface mounted within the housing; and
a camera lens assembly coupled to an underside of the housing, the camera lens assembly having a camera body, a camera lens mounted within the camera body, and an asymmetrical recessed groove unitarily formed in an exterior surface of the housing and encircling the camera body;
wherein the groove has a first portion defined by a first sidewall, a second sidewall and a first floor portion and a second portion defined by the first sidewall, a third sidewall, and a second floor portion, and the first portion has a first width and the second portion has a second width larger than the first width, the camera lens protrudes at least partially from the exterior surface of the housing, and the groove is configured to reduce a flow of liquid droplets over the camera lens.

8. The automotive vehicle of claim 7, wherein the first portion is located forward of the camera lens.

9. The automotive vehicle of claim 7, wherein the second portion is located rearward of the camera lens.

10. The automotive vehicle of claim 8, wherein the first portion is separated from the camera body by a separating portion that defines a spacing distance.

11. The automotive vehicle of claim 9, wherein the second portion is adjacent to the camera body.

12. The automotive vehicle of claim 10, wherein the camera body and the groove are circular and the first portion extends around a circumference of the camera body.

13. A side-mounted mirror for a vehicle, comprising:
a housing;
a reflective surface mounted within the housing;
a camera lens assembly coupled to an underside of the housing, the camera lens assembly having a camera body and a camera lens mounted within the camera body; and
an asymmetrical recessed area unitarily formed in the underside of the housing, the recessed area encircling the camera lens assembly and configured to reduce liquid droplet accumulation on the camera lens of the camera lens assembly;
wherein at least a portion of the camera lens protrudes at least partially from the housing and the recessed area is configured to reduce a flow of fluid over the camera lens.

14. The side-mounted mirror of claim 13, wherein the recessed area has a first portion defined by a first sidewall, a second sidewall and a first floor and a second portion defined by the first sidewall, a third sidewall, and a second floor, the first portion has a first width and a first depth, and the second portion has a second width larger than the first width, and a second depth.

15. The side-mounted mirror of claim 14, wherein the asymmetrical recessed area encircles the camera body.

16. The side-mounted mirror of claim 15, wherein the first portion is located forward of the camera lens.

17. The side-mounted mirror of claim 15, wherein the second portion is located rearward of the camera lens.

18. The side-mounted mirror of claim 16, wherein the first portion is separated from the camera body by a separating portion that defines a spacing distance.

19. The side-mounted mirror of claim 17, wherein the second portion is adjacent to the camera body.

20. The side-mounted mirror of claim 18, wherein the camera body and the recessed area are circular and the first portion extends around the circumference of the camera body.

* * * * *